L. TABBERT.
COMBINATION SLED AND WAGON.
APPLICATION FILED APR. 24, 1914.

1,120,251.

Patented Dec. 8, 1914.
3 SHEETS—SHEET 1.

WITNESSES
William J. Mix
Paul A. Niersen.

INVENTOR
L. Tabbert
H. Sandles
BY                    ATTY.

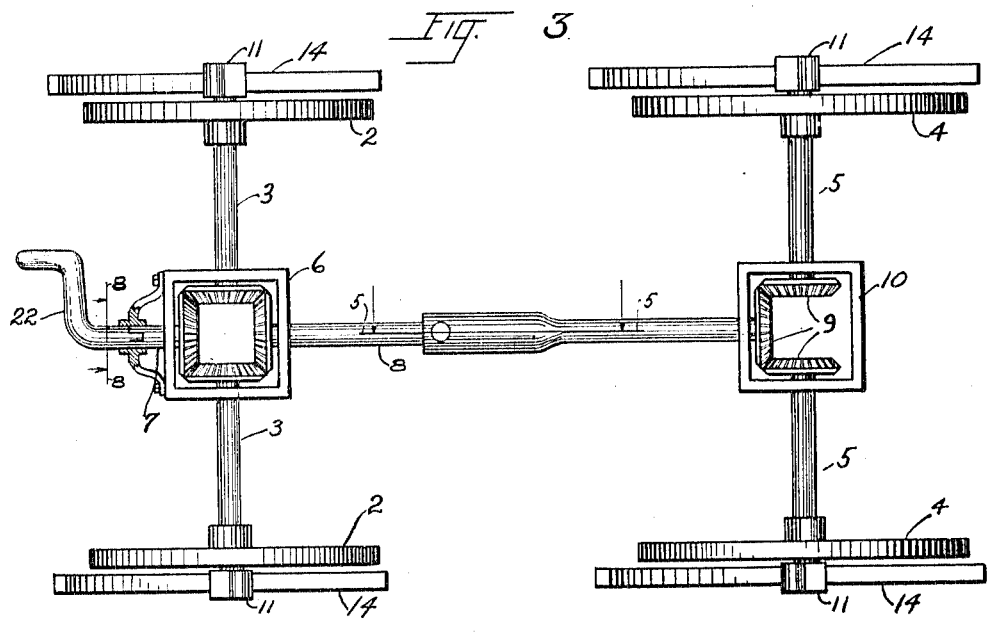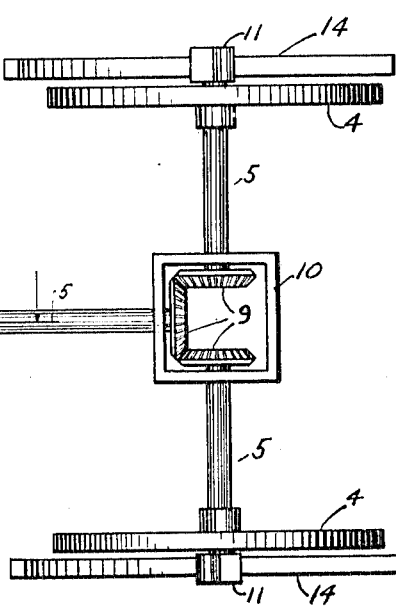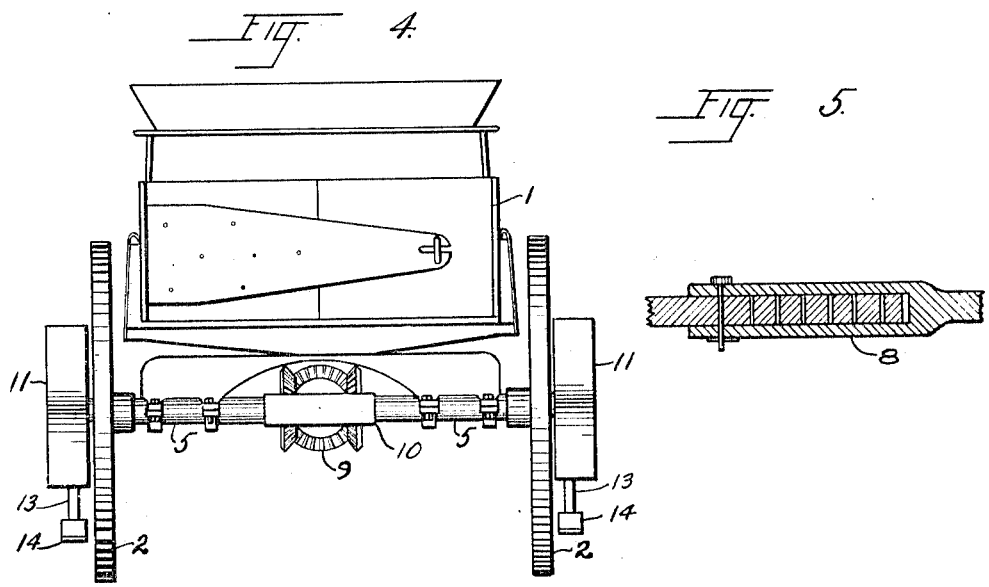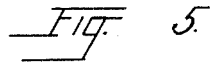

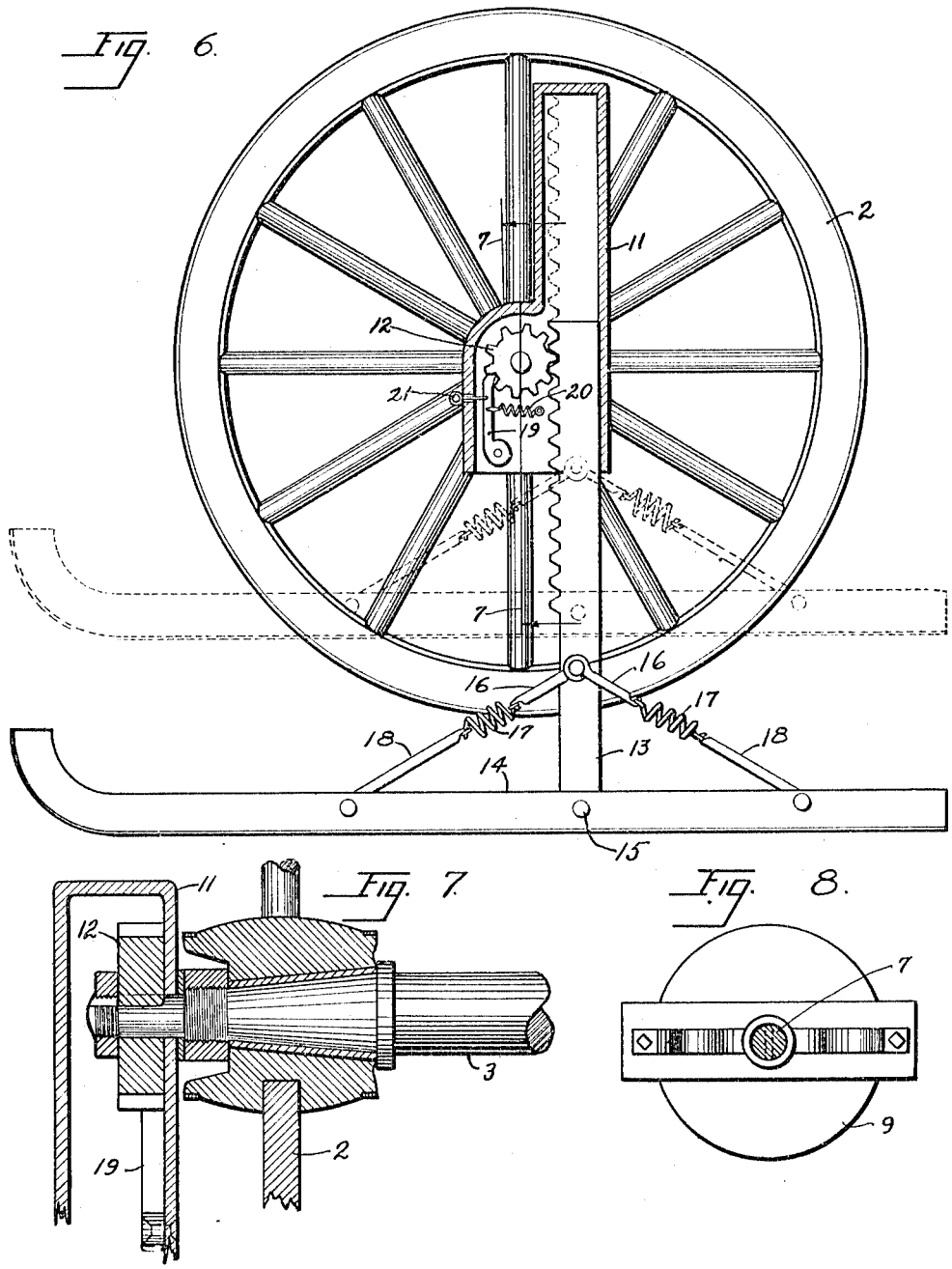

UNITED STATES PATENT OFFICE.

LEONHART TABBERT, OF YALE, IDAHO.

COMBINATION SLED AND WAGON.

1,120,251.  Specification of Letters Patent.  Patented Dec. 8, 1914.

Application filed April 24, 1914. Serial No. 834,273.

*To all whom it may concern:*

Be it known that I, LEONHART TABBERT, a citizen of the United States, residing at Yale, in the county of Cassia and State of Idaho, have invented certain new and useful Improvements in Combination Sleds and Wagons, of which the following is a specification.

This invention relates to improvements in combination sleds and wagons and its object is to produce a device that is adapted for use upon snow, ice and the bare ground and it consists in a vehicle provided with wheels upon which it normally travels over the bare ground and with runners, normally retained in suspension, by which it is enabled to travel upon snow or ice.

Another object is to provide means for readily transferring the vehicle from its wheel supports to its runner supports and vice versa, the runners being raised or lowered uniformly.

With the foregoing and other objects in view the invention consists in the combination and arrangement of parts to be hereinafter fully described in the following specification, pointed out in the claims and illustrated in the accompanying drawings which form a part of said specification and in which—

Figure 1:
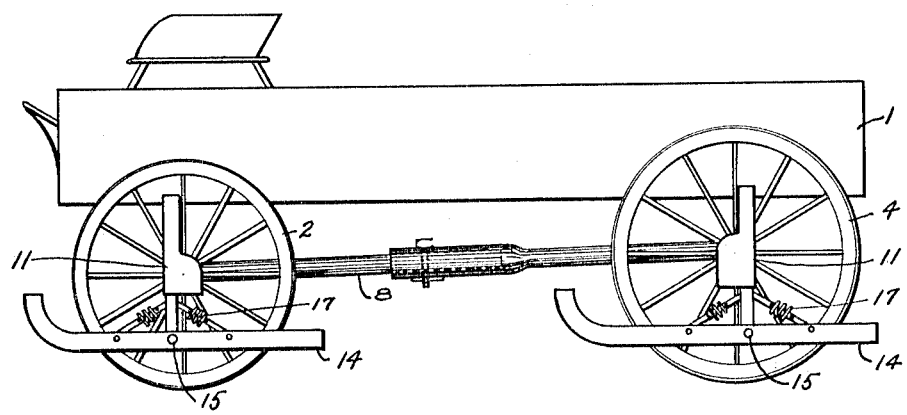
Figure 2:
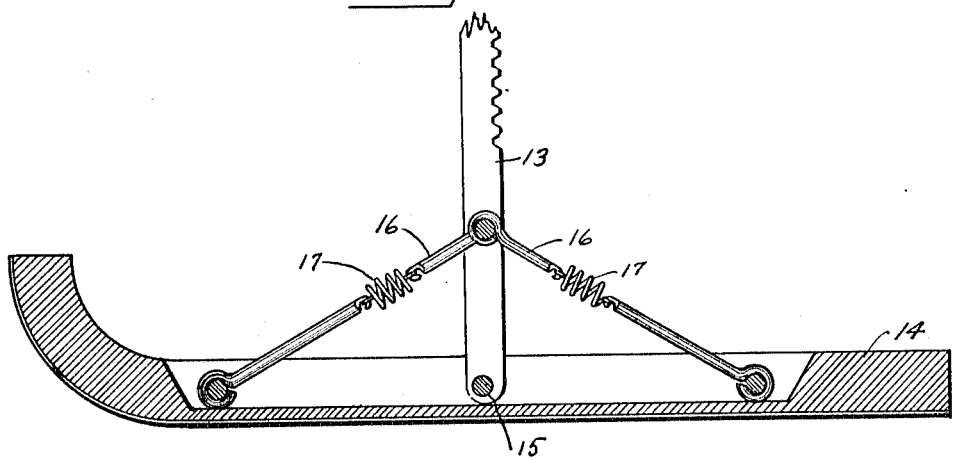

Figure 1 is a side elevation of my improved combination wagon and sled. Fig. 2 is a section through one of the runners showing its supports. Fig. 3 is a plan of the vehicle with the wagon box removed. Fig. 4 is an end view of the vehicle. Fig. 5 is a section taken on line 5—5 of Fig. 3. Fig. 6 is an enlarged view of a wheel and runner showing the former suspended and the latter in operative position. Fig. 7 is a section taken on line 7—7 of Fig. 6. Fig. 8 is a section taken on line 8—8 of Fig. 3.

Like reference characters indicate corresponding parts throughout the several views.

The reference numeral 1 indicates the box or body of my improved vehicle which is provided with front wheels 2—2 loose upon a two-piece front axle 3—3 and said box 1 is further provided with rear wheels 4, 4 loose upon two-piece rear axles 5, 5. The relatively adjacent ends of the front axle pieces are disposed within a boxing 6 and are connected by terminal bevel gears with a stub shaft 7 and with a two-piece rotary shaft 8 that extends to and is connected with the two-piece rear axle 5, 5 by bevel gears 9 disposed within a boxing 10 carried by the connected shaft-ends. The shaft 8 is of the partially telescoping variety in order to make it adjustable to a variety of lengths. To the relatively remote ends of each axle 3, 3 and 5, 5 housings 11 are secured, within which pinions 12 are supported upon the ends of said axles and said pinions are in engagement with vertical racks 13 that extend through the lower or open ends of the housings and are connected to the runners 14 as at 15 and each rack is provided with pivotally carried links 16, 16 that are connected by springs 17, 17 to additional links 18, 18 that engage the said runners. A dog 19 pivoted within each housing is retained, through tension of a spring 20, in engagement with the pinion 12 to normally prevent rotation of the same.

21 is a release finger connected to the dog 19 and projected through a small aperture in the housing and by means of the same the dog may be drawn away from the pinion to permit rotation of the same when desired. To the shaft 7 at the front end of the vehicle a crank 22 is releasably secured.

Operation:—In Fig. 1 of the drawings the vehicle is shown supported upon its wheels. To substitute the runners for said wheels the crank 22 is rotated in a direction that will cause the pinions 12, through the medium of their connections with said crank, to lower the racks 13 to the ground and continued rotation of said crank will throw the weight of the vehicle upon the pinions and racks and runners, raising the wheels clear of the ground. Reverse rotation of the crank will, of course, again substitute the wheels as supports for the vehicle.

What is claimed is:—

1. A combined wagon and sled comprising a body, a two-piece front axle carried thereby, a two-piece rear axle carried thereby, a two-piece rotary shaft bevel-gear-connected to said front and rear axles, a stub shaft bevel-gear-connected to said front axle, wheels loosely carried by said axles, housings carried by the relatively remote ends of each of said axles, runners, raising and lowering means for said runners arranged within said housings operatively associated with the ends of said two-piece axles and means associated with said stub shaft whereby the same may be rotated to transmit rotary motion to each of said axles and to said two-piece rotary shaft.

2. A combined wagon and sled comprising a body, a two-piece front axle carried thereby, a two-piece rear axle carried thereby, a two-piece rotary shaft bevel-gear-connected to said front and rear axles, a stub shaft bevel-gear-connected to said front axle, wheels loosely carried by said axles, housings carried by the relatively remote ends of each of said axles, runners, vertically movable racks secured thereto and projected into said housings, means connecting said racks and the said axles whereby rotary movement of the latter will impart vertical movement to the former, means associated with said stub shaft whereby the same may be rotated to rotate said axles and shock absorbing means connecting the said runners and the aforesaid racks.

In testimony that I claim the foregoing as my own I have hereto affixed my signature in the presence of two subscribing witnesses.

LEONHART TABBERT.

Witnesses:
S. P. WEBER,
J. F. KRANK.

Copies of this patent may be obtained for five cents each, by addressing the "Commissioner of Patents, Washington, D. C."